United States Patent [19]

Vangedal-Nielsen

[11] E Patent Number: Re. 31,890

[45] Reissued Date of Patent: May 21, 1985

[54] FREEZING MOULD BAG

[76] Inventor: Erling Vangedal-Nielsen, Kirke Vaerlosevej 67, DK-3500, Vaerlose, Denmark

[21] Appl. No.: 294,804

[22] Filed: Aug. 20, 1981

Related U.S. Patent Documents

Reissue of:

[64] Patent No.: 4,181,285
Issued: Jan. 1, 1980
Appl. No.: 872,023
Filed: Jan. 24, 1978

[30] Foreign Application Priority Data

Jan. 25, 1977 [DK] Denmark ..... 309/77

[51] Int. Cl.[3] ..... B28B 7/34; B28B 7/06

[52] U.S. Cl. ..... 249/61; 249/110; 249/127; 249/119; 62/530; 383/38; 383/72

[58] Field of Search ..... 229/62, 56, 54; 150/3

[56] References Cited

U.S. PATENT DOCUMENTS

| | | | |
|---|---|---|---|
| 1,739,625 | 12/1929 | Wolters | 62/530 |
| 2,011,832 | 8/1935 | Slater | 62/530 |
| 2,166,568 | 7/1939 | Kuhlke | 107/54 |
| 2,235,966 | 3/1941 | Summers | 165/45 UX |
| 2,545,592 | 3/1951 | Sherbloom . | |
| 2,550,633 | 4/1951 | Zalkind | 62/530 X |
| 2,589,577 | 3/1952 | Rosenthal | 62/530 X |
| 2,618,130 | 11/1952 | Leichtman et al. . | |
| 2,656,844 | 10/1953 | Kreuger | 52/2 |
| 2,800,269 | 7/1957 | Smith | 62/530 |
| 2,813,799 | 11/1957 | Bender et al. | 99/181 |
| 2,870,954 | 1/1959 | Kulesza | 229/62.5 |
| 2,932,385 | 4/1960 | Bollmeier | 62/530 |
| 2,964,920 | 12/1960 | Staebler . | |
| 2,966,041 | 12/1960 | Zearfoss et al. | 425/89 X |
| 2,971,850 | 2/1961 | Barton | 62/530 X |
| 2,987,114 | 6/1961 | Klepper | 52/2 X |
| 3,008,214 | 11/1961 | Foster et al. | 52/2 X |
| 3,052,399 | 9/1962 | Brown | 206/623 |
| 3,095,291 | 6/1963 | Robbins | 62/530 X |
| 3,098,563 | 7/1963 | Skees | 206/46 |
| 3,129,568 | 4/1964 | Knepper | 249/126 X |
| 3,207,420 | 9/1965 | Navarrete-Kindelan | 229/56 |
| 3,217,971 | 11/1965 | Shvetz | 229/62 |
| 3,299,927 | 1/1967 | Clarizio | 229/62 R X |
| 3,306,567 | 2/1967 | Frei | 249/127 X |
| 3,396,542 | 8/1968 | Lamberton | 249/10 |
| 3,425,227 | 2/1969 | Hillen | 249/10 X |
| 3,463,161 | 8/1969 | Andrassy | 165/46 X |
| 3,542,032 | 11/1970 | Spencer | 165/46 X |
| 3,830,676 | 8/1974 | Elkins | 62/530 X |
| 3,961,743 | 6/1976 | Hallowell | 229/62 R |
| 4,181,285 | 1/1980 | Vangedal-Nielsen | 249/110 X |

FOREIGN PATENT DOCUMENTS

| | | | |
|---|---|---|---|
| 263621 | 7/1968 | Austria | 229/54 R |
| 790514 | 7/1968 | Canada | 249/10 |
| 1920118 | 10/1970 | Fed. Rep. of Germany . | |
| 1028940 | 3/1953 | France . | |
| 1303694 | 8/1962 | France . | |
| 1392961 | 2/1965 | France . | |
| 1537104 | 7/1968 | France . | |
| 2040845 | 1/1971 | France . | |
| 2159549 | 5/1973 | France . | |
| 2198463 | 3/1974 | France . | |
| 2271520 | 12/1975 | France . | |
| 380435 | 10/1964 | Switzerland . | |
| 1185811 | 3/1970 | United Kingdom | 62/530 |
| 1426065 | 2/1976 | United Kingdom . | |

OTHER PUBLICATIONS

37 QB" Ice Bag and Printed Instructions for Use, Distributed in 1966, by Octaviano de J. Navarrete—Kindelan, Santurce, Puerto Rico.

Four Roses Ice Bag, Distributed by Four Roses Distillers Co., New York, New York in 1965.

The Condensed Chemical Dictionary, Reinhold Publishing Corp., New York 1956, p. 879.

*Primary Examiner*—J. Howard Flint, Jr.

*Attorney, Agent, or Firm*—Fleit, Jacobson, Cohn & Price

[57] ABSTRACT

Freezing mould bags are disclosed, having a plurality of mould compartments, which communicate with each other and, in turn, with a liquid inlet. The liquid inlet and the mould compartments are defined by a pattern of joints or sealings between two opposed bag sheets constituting the bag walls. The mould bags are well-suited for preparing ice pieces of the ice "cube"-type, but may also be used for other purposes.

The questions raised in reexamination request No. 90/000,090, filed October 15, 1981 has been considered and the results thereof are reflected in this reissue patent which constitutes the reexamination certificate required by 35 U.S.C. 307 as provided in 37 CFR 1.570(e).

25 Claims, 12 Drawing Figures

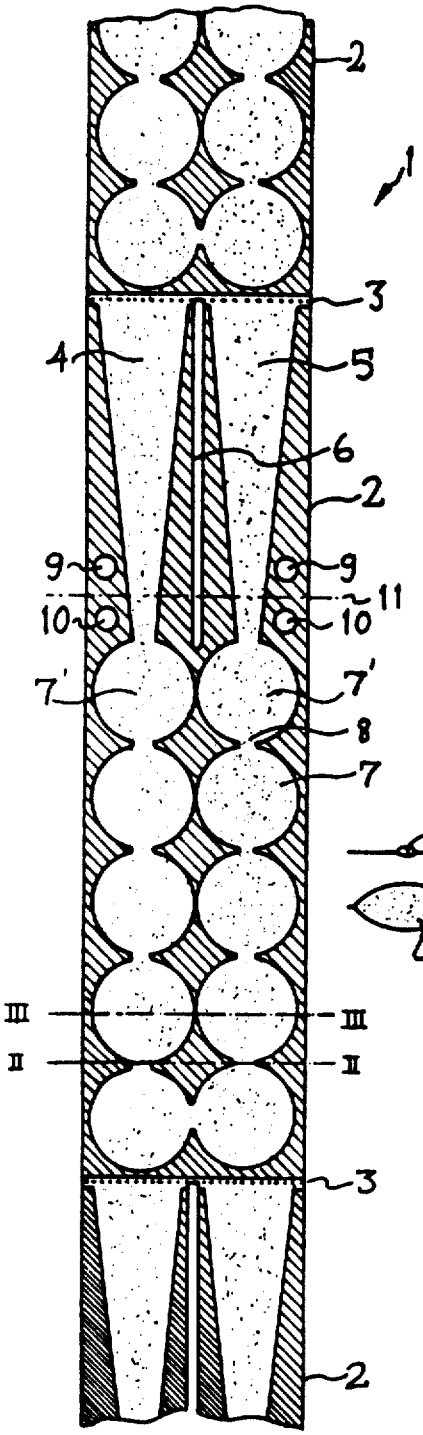
FIG. 1
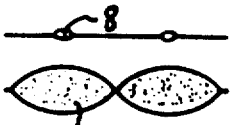
Fig 2.
Fig 3.
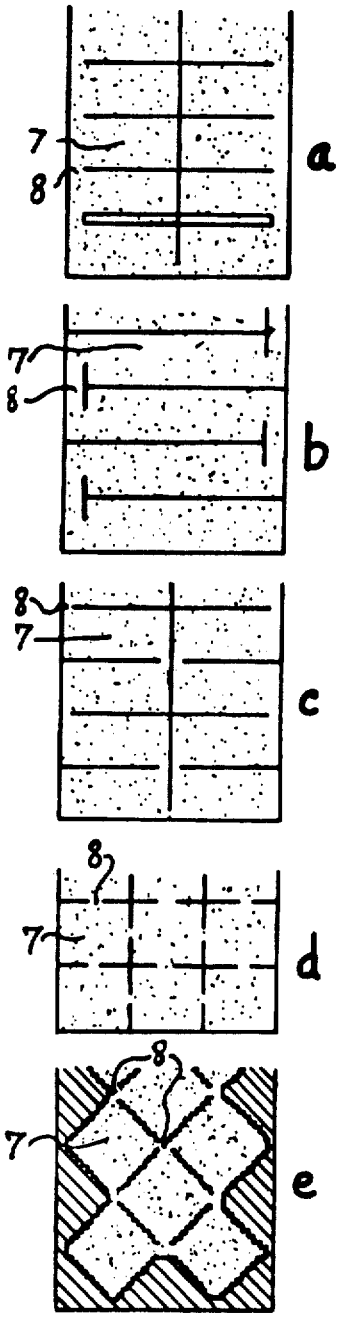
FIG. 4.

FREEZING MOULD BAG

Matter enclosed in heavy brackets [ ] appears in the original patent but forms no part of this reissue specification; matter printed in italics indicates the additions made by reissue.

The present invention relates to a freezing mould bag for preparing ice pieces.

Heretofore socalled ice cubes have been prepared in relatively shallow and partitioned trays which are filled with liquid and placed in a freezer, e.g. the freezer compartment of a refrigerator. Such open mould trays are to be disposed horizontally in the freezer in order to avoid spillage of liquid from the trays. Accordingly, the number of trays, which may be disposed in a freezer, is limited and, thereby, the number of ice cubes which may be prepared at one time is restricted.

U.S. Pat. No. 2,964,920 discloses a mould bag which, after being filled with water, juice or the like, is inserted between two hinged grid elements or trays which are thereafter closed around the filled bag, whereby the bag is locally clamped to provide a number of mould compartments filled with liquid.

After the freezing, the hinged grid elements have to be removed from the mould bag and the ice pieces may, thereafter, be broken from each other, either while still located in the bag or after the ice pieces have been removed from the bag as an integral block.

This prior art freezing mould bag must necessarily have a certain strength, since the bag must be able to carry the weight of the entire mount of liquid and, moreover, the bag may not burst during the clamping of the bag in filled condition. Thus, a relatively strong sheet must be used for the bag and this fact in connection with the necessity of the particular grid elements for clamping the filled bag causes substantial costs. Moreover, the grid or tray elements are complicating factors both during the dividing of the filled bags into smaller compartments and during the removal of the prepared ice pieces as well.

French Pat. No. 2,271,520 also discloses a freezing mould bag. This prior art mould bag is, however, primarily designed for preparing a few and relatively big ice bars which are to remain in the bag during use for cooling purposes, and the bag is adapted to collect and retain the melting liquid.

The structure disclosed is not suitable for preparing larger numbers of small sized ice pieces which may be removed from the mould bag in a simple manner before use, e.g. for cooling drinks or the like.

The present invention provides a freezing mould bag in the shape of a foil bag divided into compartments and having at least one filling opening, and wherein said division into compartments is provided by joining together two opposed bag wall sheets, said filling opening communicating with at least one first mould compartment. The moulding bag is characterized in that further mould compartments communicate with each other and with said first mould compartment through openings between said compartment defining joints.

Due to the particular division of the mould bag according to the invention in several smaller mould compartments, a complicating and cost involving mechanism for clamping the bag is completely superfluous. The mould bag may, moreover, be made of a rather thin sheet material, preferably a thin and flexible plastic sheet material and the mould bag may then be used as a disposable bag which may easily be torn when the prepared ice pieces are to be removed from the bag.

When filling the mould bag according to the invention with liquid, with filling opening of the bag may e.g. be placed around a water cock. The liquid may flow from compartment to compartment which are filled and distended successively. Since the empty mould bag may be completely flat, the amount of air which has to escape from the interior of the bag during the filling thereof, will be limited. In most cases it is not necessary to take specific measures in order to make sure that air may escape from the bag during the filling thereof, but if desired there may be provided e.g. two filling openings, only one opening being used for filling of liquid while air may escape through the other opening.

After being filled with liquid, the mould bag according to the invention may be closed off in a liquid-proof manner, and a number of filled bags may thereafter be disposed or stacked in a freezer without considering the orientation of the bags. However, the filled mould bags may also be suspended on hangers or racks in a freezer and several bags filled with liquid can be suspended hanging freely from the same hanger in this manner without necessarily having the filling openings of the bags closed off in a completely liquid-proof manner.

The frozen ice pieces may easily be removed by tearing the mould bag. In that connection, it is a particular advantage of the bag according to the invention that the ice pieces may be removed individually and, accordingly, it is possible to remove a desired number of ice pieces whereafter the mould bag with remaining ice pieces may be disposed in the freezer again for later use.

Due to the structure of the freezing mould bag, it is possible to prepare ice pieces having several various shapes. However, the ice pieces will get a biconvex cross-section, and pillow- or lense-like shapes would, therefore, be preferred. However, various figures such as fishes or the like may also be prepared.

The freezing mould bag according to the invention is also well-suited for use as a disposable package or sales package for ice products of various types, including socalled "freeze-it-yourself" ice.

In the following, the invention will be explained in further detail, based on specific embodiments and with reference to the drawings wherein FIG. 1 shows a continuous web including freezing mould bags in accordance with a first embodiment of the invention;

FIG. 2 is a sectional view taken on II—II in FIG. 1, but showing the condition after filling of the bag with liquid;

FIG. 3 is a sectional view taken on III—III in FIG. 1, but showing the condition after filling the bag with liquid;

FIG. 4a-4e are schematic illustrations of various alternative possibilities of defining mould compartments in a freezing mould bag according to the invention;

Figure 5:
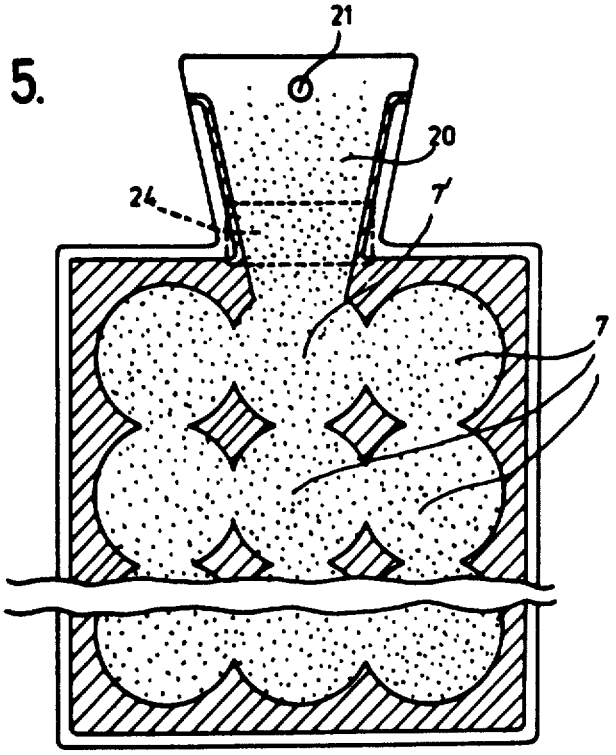
FIG. 5 shows a further embodiment of the mould bag according to the invention.

Referring now to the drawings, FIG. 1 shows a web 1 including a series of mould bags 2 made of thin plastic foils, the bag being connected at tear-off lines 3 so that the bags may be separated from each other in the same manner as known in connection with plastic bags for domestic or similar uses. The two opposed sides or walls of each bag are joined at certain areas which are indicated by hatchings in FIG. 1, and thereby are several compartments defined between the two sides or bag walls. In the embodiment of FIG. 1, the compartments include two funnel shaped openings 4 and 5, the confronting edges thereof defining a slit 6 extending from a location adjacent to the narrowest portion of the funnels and all the way out to the tear-off line 3 or even beyond that line.

The funnels 5 and 6 communicate at their narrowest ends with respective first mould compartments 7' being a part of respective rows of compartments 7 which communicate with each other through short connection channels 8. In the embodiment of FIG. 1, there is only one connection channel 8 between successive mould chambers 7 and, accordingly, there is only one flow path from one funnel, through the mould compartments and then to the other funnel. However, additional transverse connection channels or openings may be provided, if necessary or desired. At the level of the narrowest portions of the two funnels there may be provided two pairs of holes 9, 10, which may be used for suspending a mould bag 2 on a hanger or the like after the bag has been folded at a folding line indicated at 11 in FIG. 1.

When the mould bag 2 is to be used for freezing ice pieces, the bag is separated from the web 1. Thereafter, the bag is filled with liquid, e.g. by inserting one of the two funnels 4, 5 over an ordinary water cock which is then opened for a sufficiently long time to fill the compartments of the bag 2 with water. Any air present in the interior of the bag 2 will be expelled through the other funnel by the inflowing water. The filling is continued until all compartments have been filled and the water will cause the mould compartments and the connection channels to bulge as shown in FIGS. 2 and 3.

If the filled mould bag is to be disposed horizontally during the freezing of the water in the compartments 7, the filling end of the bag including the funnels 4 and 5 is closed off, e.g. by twisting the funnels 4, 5 together and by closing them by means of an appropriate clamp or a wire. Alternatively, the bag may be closed off simply by tying the two funnels together in one or more knots.

If, on the other hand, the filled mould bag 2 is to be disposed in e.g. a deep-freezer in which space is available to suspend the bag in a vertical position, then the filling end of the bag may be folded at the folding line 11 between the two pairs of holes 9, 10 so that the holes 9 are aligned with the respective holes 10, whereafter the bag may be suspended on a hanger or on other suitable suspending means (not shown).

When the frozen ice pieces are to be used, a mould bag is removed from the freezer and the ice pieces are released from the bag by squeezing them out through the thin plastic sheet material. The ice pieces may be released, beginning from one end of the bag and when a desired number of ice pieces has been released, the bag and remaining ice pieces therein may thereafter be disposed in the freezer again. The ice pieces will be connected to each other by thin ice bridges formed in or by the connection channels 8, but such ice bridges may easily be broken, when releasing the ice pieces. When the mould bag 2 has been emptied, it is disposed of as it cannot be reused due to the tearing of the plastic material. Since the plastic material may be very thin, the disposed bag does not represent any substantial waste of material.

In order to be able to remove pieces of plastic material which may stick to the released ice pieces, the plastic sheet material may appropriately be coloured.

FIGS. 4a-4e show various alternative possibilities of designing the portion of the bag 2 in which the mould compartments 7 and the connection channels 8 are located. In the embodiment shown in FIG. 4b there is, as will appear, no specific arrangements to have air expelled from the interior of the bag since this embodiment is based on the fact that the bag may be flat before the filling thereof and, accordingly, it does not contain any substantial amount of air.

In the embodiment illustrated in FIG. 4e, the sealing lines which define the mould compartments 7 are wave-shaped, resulting in the ice pieces being provided with serrated edges which facilitate bringing the sheet material to burst during the release of ice pieces and which also have a decorative effect on the ice pieces prepared.

The embodiments illustrated in FIGS. 4a-4e should only be considered as examples, since many other shapes of the mould compartments 7 and the boundary surfaces or sides thereof may be contemplated. Thus, e.g. the square pattern of FIG. 4e with wave edges may be replaced by a honeycomb like pattern with or without wave edges. The mould compartments 7 may also be shaped in order to provide ice pieces shaped as e.g. small fishes or other animals.

In order to facilitate the removal or release of the ice [pices,] *pieces,* the mould bag 2 may be held under a water cock so that the outer layer of the ice melts, whereby the ice pieces are detached from the plastic sheet material.

It is not necessary to have two funnels as in FIG. 1, since as mentioned in connection with FIG. 4b above, the air may be expelled from the interior of the bag by striking the bag flat before filling.

FIG. 5 shows a further embodiment of the freezing mould bag according to the invention. In this embodiment, the two bag sheets are joined together to provide substantially circular mould compartments arranged in rows. Each compartment communicates with adjacent compartments, the circular boundary of each compartment overlapping the corresponding boundaries of the respective adjacent compartments to some extent. The joined or sealed areas are indicated by hatchings in FIG. 5.

In the embodiment according to FIG. 5, the filling opening of the bag is designed as a funnel shaped conduit 20 defined by sealings between the two bag sheets. The funnel shaped conduit 20 communicates with a first mould compartment 7' from which liquid may flow on to all subsequent or further mould compartments.

Also this embodiment may be closed off after filling with liquid either by tying a knot on that bag portion including the funnel 20 or by means of a suitable clamp or corresponding means which is disposed on or around the funnel 20 to close it. The mould bag shown may also have an opening 21 whereby the bag may be suspended in filled condition and in that case it is not strictly necessary to close the filling conduit 20.

Figure 6:
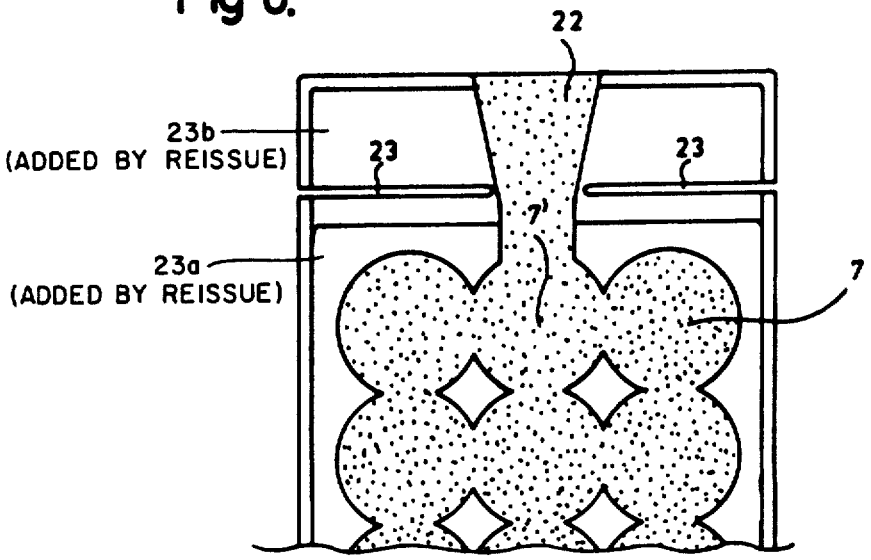
FIG. 6 shows still another embodiment of the mould bag according to the invention.

FIG. 6 shows yet another embodiment of the freezing mould bag according to the invention in which the mould compartments are defined by linear joints contrary to the embodiment according to FIG. 5 in which the compartments are defined by joined or sealed areas.

In FIG. 6, the filling opening is also designed as a funnel shaped inlet conduit 22 *in the form of a central filling channel having a central filling channel axis and* communicating with a first mould compartment 7' which, in turn, communicates with the other mould compartments 7. However, the inlet conduit 22 is not provided in a neck shaped portion of the bag as in FIG. 5. The mould bag is instead generally rectangular in shape and in the area immediately above the upper mould compartments there are provided two slit shaped cuts 23 extending from respective side edges of the bag and to a point immediately outside the sealings defining the inlet conduit 22. *The cuts 23 divide the bag into lower portion 23a and an upper portion 23b. As illustrated in FIG. 6, the cuts 23 are collinear. The latter sealings define the central filling channel side edges, which are substantially equally spaced from the filling channel axis and from the side edges of the bag.*

With this arrangement of the top or filling end of the mould bag, a particular closing technique may be used after the bag has been filled with liquid. The bag portions *23b* outside of the cuts 23, *which extend in the direction of said filling channel axis between a first transverse plane passing through the opening of the filling channel and a second transverse plane spaced from the first transverse plane along the filling axis and passing through the cuts,* may be folded (downwardly in FIG. 6) one or several times along transverse folding lines and thereafter the two wings thus provided may be moved toward each other, whereafter they may be tied together in a knot so that the inlet conduit 22 will be closed.

The arrangement shown in FIG. 6 as to the top of the mould bag is, moreover, advantageous in that no waste in the shape of severed sheet material will occur as will be the case when preparing a mould bag as that of FIG. 5.

In the embodiment according to FIG. 5, the mould compartments may also be defined by linear joints in a similar manner as in FIG. 6 and the embodiment according to FIG. 5 may also be provided with a top or inlet end similar to that of FIG. 6.

As mentioned above, the various embodiments of the freezing mould bag according to the invention may be particularly adapted for closing after filling with liquid, or they may be adapted to be suspended in filled condition.

However, if desired the various embodiments may also be provided with valve means of the check valve type which, when the bag has been filled with liquid, prevents that liquid flows back or out through the filling opening. Such valve means may e.g. be a suitable lip or duckbill valve appropriately inserted e.g. as indicated schematically and with dotted lines at 24 in FIG. 5.

However, the valve means may also simply consist of at least one suitably flexible and movable closing flap inserted and attached between the bag wall sheets.

Figure 7:
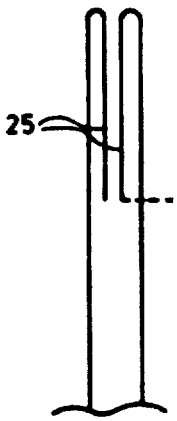
FIG. 7 is a side view schematically illustrating how closing flaps may be provided in mould bags according to the invention by folding the bag walls.
Figure 8:
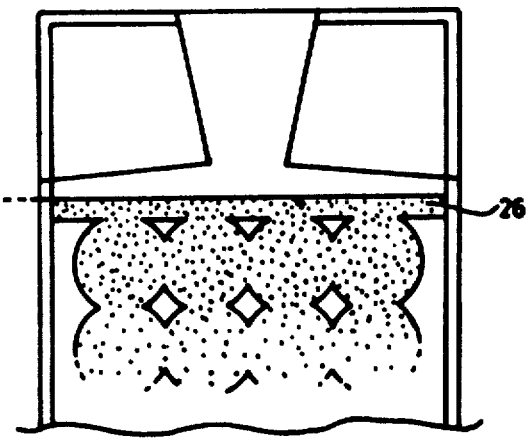
FIG. 8 is a partial plan view showing a mould bag according to the invention provided with closing flaps in accordance with FIG. 7.

A closing flap arrangement may also be provided by means of the big wall sheets. As indicated in FIG. 7, the upper part of the two bag sheets may be folded backwardly and inwardly to provide two flaps 25. These flaps may, as shown in FIG. 8, form a closing arrangement in a transverse conduit 26 which, moreover, may serve as a liquid distributing conduit. Flaps with similar functions may also be provided by inserting separate sheets between the two bag wall sheets.

In the embodiments described above, the filling openings are shaped as one or more funnel shaped inlet conduits which is advantageous during the filling of the bags with liquid. Such a funnel shaped inlet is, however, not strictly necessary since e.g. the respective first or first lying mould compartments 7' may serve as inlet chambers. Just to illustrate that, the neck shaped inlet of the embodiment according to FIG. 5 could be completely omitted and a water cock or similar device could then be inserted in the compartment 7' when filling the bag with liquid. After the filling, the opening could then be closed in a suitable manner e.g. by means of a transverse heat sealing.

The various mould compartments of the freezing mould bag according to the invention may be defined, shaped and connected in several ways as long as all compartments may be filled with liquid from the filling opening of the bag. However, in order to have a proper liquid distribution it is preferred that each mould compartment communicates with all surrounding or adjacent compartments, e.g. as in the embodiments of FIGS. 5 and 6.

The compartment defining joints in the mould bag according to the invention may be sealed areas e.g. as in FIG. 1 or in FIG. 5. However, as to manufacture, it may be advantageous that the joints are linear, e.g. as in FIGS. 4a–4e or as in FIG. 6.

The joints or sealings may be provided as heat sealings, including high frequency weldings or by means of suitable adhesives.

Mould bags according to the invention are preferably made of relatively thin plastic foil materials. Examples of suitable materials are polyethylene, polypropylene or polyvinyl-chloride.

The mould bags according to the invention may be prepared and marketed in the shape of continuous webs of the type shown in FIG. 1, but the bags may also be prepared individually and be marketed e.g. in bundles which may be inserted on a hanger or similar means by holes and the hanger may go with the mould bags for use in a deep freezer or other freezing compartment permitting vertical suspension of the bags.

Mould bags according to the invention may also be used to market prefrozen ice pieces including batches of ice cream and ice with various additives and in such cases the mould bags with their contents may be disposed in freezing vitrines in the shops.

Finally, mould bags according to the invention are well-suited for marketing and distribution of socalled "freeze-it-yourself"-ice and in such cases the mould bags are prefilled with liquid and sealed on the manufacturing site. Alternatively, the mould bags may be sold together with a container with the liquid for freezing, and the consumers may then fill and freeze the mould bags with liquid from such a container.

I claim:

1. A disposable freezing mould bag for receiving and retaining therein liquid to be frozen into a plurality of objects suitable for human consumption, and for being destroyed to gain access to the frozen objects, the mould bag comprising: first and second generally rectangular opposed sheets of thin and flexible [plastics] *plastic* material defining the walls of the mould bag, said opposed sheets having top edges, bottom edges and side edges, and being flat and lying in contact with one another prior to the bag being filled with liquid; said first and second opposed sheets being heat sealed at a plurality of positions spaced over selected portions of the sheets, with the exception of defined unsealed portions for receiving the liquid to be frozen;

the unsealed portions in a lower generally rectangular portion of the bag defining a plurality of interconnected compartments of substantially the same configuration, the compartments being interconnected by channels of reduced cross-sectional area, the walls of the compartments being defined by said opposed sheets, and being in substantial contact with each other prior to filling of the bag and each being distended away from the other by the liquid to be frozen after filling of the bag, said first and second opposed sheets being of a thickness so as to be rupturable at said unsealed compartments to facilitate removal of the frozen objects from the bag; [and]

the unsealed portions in an upper generally rectangular portion of the bag defining a *central* filling channel *having side edges substantially equally spaced from a filling channel axis and from side edges of the bag and* extending from *an opening at* the top edge of the bag to at least one of said compartments so that liquid entering the opening of said filling channel flows into, distends, and fills all of the compartments; *and*

*cuts formed in an area of the bag immediately above the compartments in the lower portion of the bag, the cuts extending inwardly from each of the side edges of the bag and terminating at points spaced outwardly of the side edges of the filling channel so that first and second substantially rectangular upper portions are defined between said cuts and the top edges of said first and second opposed sheets, the upper portions being positioned on respective sides of said filling channel and extending transversely outwardly relative to the axis of the filling channel to the opposite side edges of the sheets, said upper portions extending in the direction of said filling channel axis between a first transverse plane passing through the opening of said filling channel and a second transverse plane spaced from said first transverse plane along the filling axis and passing through said cuts in the area immediately above the compartments, said outwardly extending first and second upper portions being foldable downwardly along transverse folding lines to define opposed wing means separate from the lower portion of the bag containing the compartments, said wing means being sufficient in transverse length to permit the wing means to be tied together in a knot so that the tied wing means completely close the filling channel once the bag is filled with liquid to be frozen;* said bag being flat when unfilled, adapted to receive liquid through said filling channel to all of said compartments to bulge the walls of the compartments due to the presence of the liquid, and *adapted* to form a frozen mass defined by all of said compartments and unsealed channel areas therebetween, said frozen mass in the channels between compartments being readily breakable when the compartments are ruptured to gain access to the frozen objects in the compartments.

[2. The freezing mould bag of claim 1, and further comprising first and second wings defined by said first and second opposed sheets, located on respective sides of said filling channel and extending outwardly therefrom toward the opposite side edges of the sheets, said wings being sized and shaped so as to enable them to be tied together to close the filling channel once the bag is filled with liquid to be frozen.]

[3. A freezing mould bag according to claim 2, wherein said first and second wings are generally rectangular.]

4. A freezing mould bag according to claim 1, wherein only one of said compartments is in fluid communication with said gap, and wherein each of said compartments is in fluid communication with all adjacent compartments.

5. A freezing mould bag according to claim 4 wherein said compartments are in a regular pattern of rows and columns.

6. A freezing mould bag according to claim 1, wherein said filling channel is a funnel shaped conduit.

7. A freezing mould bag according to claim 1, wherein each compartment communicates with all adjacent compartments.

8. A freezing mould bag according to claim 1, wherein the compartments are arranged as several rows of circular compartments between the first and second opposed sheets.

9. A freezing mould bag according to claim 1, wherein said compartments are defined by linear heat sealings between the first and second opposed sheets.

10. A freezing mould bag according to claim 9, wherein said linear heat sealings are interrupted lines.

11. A freezing mould bag according to claim 9, wherein said linear heat sealings are wave-shaped lines.

12. A freezing mould bag according to claim 1, wherein said filling channel is provided with valve means adapted to prevent liquid from flowing back and out through the filling channel.

13. A freezing mould bag according to claim 12, wherein said valve means includes at least one movable closing flap.

14. A freezing mould bag according to claim 13, wherein said closing flap is a folded portion of at least one of said bag wall sheets.

15. A freezing mould bag according to claim 1, wherein said bag further includes means for venting air from said bag as said bag is being filled with liquid.

*16. A disposable freezing mould bag for receiving and retaining therein liquid to be frozen into a plurality of objects suitable for human consumption, and for being destroyed to gain access to the frozen objects, the mould bag comprising:*

*first and second generally rectangular opposed sheets of thin and flexible plastic material defining the walls of the mould bag, said opposed sheets having top edges, bottom edges and side edges, and being flat and lying in contact with one another prior to the bag being filled with liquid;*

*said first and second opposed sheets being heat sealed at a plurality of positions spaced over selected portions of the sheets, with the exception of defined unsealed portions for receiving the liquid to be frozen;*

*the unsealed portions in a lower generally rectangular portion of the bag defining a plurality of interconnected compartments of generally circular configuration, the circles being so arranged that horizontally and vertically adjacent circles overlap to define channels of reduced cross-sectional area interconnecting adjacent compartments, the peripheral edges of the sheets in the lower portion of the bag and remaining areas between adjacent compartments being completely heat sealed so as to provide a pattern of heat sealed areas covering the entire lower portion with the*

*exception of the interconnected compartments, the walls of the compartments being defined by said opposed sheets, and being in substantial contact with each other prior to filling of the bag and each being distended away from the other by the liquid to be frozen after filling of the bag, said first and second opposed sheets being of a thickness so as to be rupturable at said unsealed compartments to facilitate removal of the frozen objects from the bag;*

*the unsealed portions in an upper generally rectangular portion of the bag cooperating with sealed portions to define a central filling channel having side edges substantially equally spaced from a filling channel axis and from side edges of the bag and extending from an opening at the top edge of the bag to at least one of said compartments so that liquid entering the opening of said filling channel flows into, distends, and fills all of the compartments;*

*cuts formed in an area of the bag immediately above the compartments in the lower portion of the bag, the cuts extending inwardly from each of the side edges of the bag and terminating at points spaced outwardly of the side edges of the filling channel so that first and second substantially rectangular upper portions are defined between said cuts and the top edges of said first and second opposed sheets, the upper portions being positioned on respective sides of said filling channel and extending transversely outwardly relative to the axis of the filling channel to the opposite side edges of the sheets, said upper portions extending in the direction of said filling channel axis between a first transverse plane passing through the opening of said filling channel and a second transverse plane spaced from said first transverse plane along the filling axis and passing through said cuts in the area immediately above the compartments, said outwardly extending first and second upper portions being foldable downwardly along transverse folding lines to define opposed wing means separate from the lower portion of the bag containing the compartments, said wing means being sufficient in transverse length to permit the wing means to be tied together in a knot so that the tied wing means completely close the filling channel once the bag is filled with liquid to be frozen;*

*said bag being flat when unfilled, adapted to receive liquid through said filling channel to all of said compartments to bulge the walls of the compartments due to the presence of the liquid, and adapted to form a frozen mass defined by all of said compartments and unsealed channel areas therebetween when said filled bag is subjected to a temperature sufficiently low to freeze the liquid, said frozen mass in the channels between compartments being readily breakable when the compartments are ruptured to gain access to the frozen objects in the compartments.*

*17. A disposable freezing mould bag according to claim 1, wherein peripheral edges of the sheets in the lower portion of the bag are heat sealed to each other.*

*18. A disposable freezing mould bag according to claim 16, wherein said filling channel is a funnel shaped conduit defined by sealings between the two opposed sheets, the sealings diverging outwardly and upwardly from only one of said compartments.*

*19. A disposable freezing mould bag according to claim 1, wherein said filling channel is defined by sealings extending upwardly from said at least one of said compartments.*

*20. The freezing mould bag of claim 1, wherein the side edges of the bag adjacent outer ends of said cuts are collinear.*

*21. The freezing mould bag of claim 16, wherein the side edges of the bag adjacent outer ends of said cuts are collinear.*

*22. The freezing mould bag of claim 1, wherein top edges of said opposed sheets are heat sealed to each other on both sides of the filling channel.*

*23. The freezing mould bag of claim 16, wherein top edges of said opposed sheets are heat sealed to each other on both sides of the filling channel.*

*24. The freezing mould bag of claim 1, wherein said cuts are slit shaped cuts so that adjacent edges of the upper and lower portions of the bag are closely spaced from each other.*

*25. The freezing mould bag of claim 16, wherein said cuts are slit shaped cuts so that adjacent edges of the upper and lower portions of the bag are closely spaced from each other.*

* * * * *